United States Patent
Wang et al.

(10) Patent No.: US 10,326,372 B2
(45) Date of Patent: Jun. 18, 2019

(54) REDUCTION OF ELECTROMAGNETIC INTERFERENCE IN A FLYBACK CONVERTER

(71) Applicant: SEMICONDUCTOR COMPONENTS INDUSTRIES, LLC, Phoenix, AZ (US)

(72) Inventors: Zhao-Jun Wang, San Jose, CA (US); Dibyendu Rana, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 27 days.

(21) Appl. No.: 15/973,900

(22) Filed: May 8, 2018

(65) Prior Publication Data

US 2018/0254710 A1    Sep. 6, 2018

Related U.S. Application Data

(63) Continuation of application No. 15/408,709, filed on Jan. 18, 2017, now Pat. No. 9,991,803.

(51) Int. Cl.
*H02M 3/335* (2006.01)
*H02M 1/34* (2007.01)
(Continued)

(52) U.S. Cl.
CPC ......... *H02M 3/33507* (2013.01); *H02M 1/08* (2013.01); *H02M 1/14* (2013.01);
(Continued)

(58) Field of Classification Search
CPC ......... H02M 3/33507; H02M 3/33523; H02M 3/335; H02M 3/33515; H02M 3/33592; H02M 3/33576; H02M 3/33561; H02M 3/33569; H02M 3/156; H02M 3/33385; H02M 3/135; H02M 3/137; H02M 3/10; H02M 3/157; H02M 3/1584; H02M 1/32; H02M 1/4258; H02M 1/12; H02M 1/4208;
(Continued)

(56) References Cited

U.S. PATENT DOCUMENTS

| 5,430,633 A * | 7/1995 | Smith ............... H02M 3/33569 363/131 |
| 9,246,391 B2 * | 1/2016 | Berghegger ...... H02M 3/33507 |

(Continued)

*Primary Examiner* — Jue Zhang
*Assistant Examiner* — Kevin H Sprenger
(74) *Attorney, Agent, or Firm* — Atesa Legal PLLC

(57) ABSTRACT

A method for reducing electromagnetic interference in a flyback converter includes activating a first switch to generate a primary current therein. The first switch is deactivated to generate a secondary current from a magnetic flux generated by the primary current. The magnetic flux is removed by the generation of the secondary current. A second switch is activated with a first voltage pulse to limit an excess voltage across the first switch. The excess voltage is generated in response to the deactivation of the first switch. A second switch is activated with a second voltage pulse to limit a voltage oscillation across the first switch. The voltage oscillation occurs after the removal of the magnetic flux. A first pulse width of the first voltage pulse is increased by a first jitter delay. A second pulse width of the second voltage pulse is increased by a second jitter delay.

20 Claims, 7 Drawing Sheets

(51) Int. Cl.
   *H02M 1/08*    (2006.01)
   *H02M 1/14*    (2006.01)
   *H02M 1/44*    (2007.01)
   *H02M 1/00*    (2006.01)

(52) U.S. Cl.
   CPC ............... *H02M 1/34* (2013.01); *H02M 1/44* (2013.01); *H02M 3/33569* (2013.01); *H02M 2001/0009* (2013.01); *H02M 2001/0048* (2013.01); *H02M 2001/344* (2013.01)

(58) Field of Classification Search
   CPC ........ H02M 1/4225; H02M 1/14; H02M 1/15; H02M 1/143; H02M 1/4266; H02M 7/217; H02M 7/219; H02M 2001/0032; Y02B 70/126; Y02B 70/1475; Y02B 70/16; Y02B 70/123
   USPC ............... 363/21.12–21.18, 44–48, 123–127
   See application file for complete search history.

(56) References Cited

U.S. PATENT DOCUMENTS

| | | | |
|---|---|---|---|
| 9,614,447 B2* | 4/2017 | Liu ................... | H02M 3/33515 |
| 2015/0244254 A1* | 8/2015 | Skinner ............. | H02M 3/33507 |
| | | | 323/222 |
| 2017/0264206 A1* | 9/2017 | Rana ................... | H02M 1/083 |

* cited by examiner

REDUCTION OF ELECTROMAGNETIC INTERFERENCE IN A FLYBACK CONVERTER

CROSS-REFERENCE TO RELATED APPLICATIONS

This application is a utility application claiming priority to co-pending U.S. patent application Ser. No. 15/408,709, filed on Jan. 18, 2017, entitled, "REDUCTION OF ELECTROMAGNETIC INTERFERENCE IN A FLYBACK CONVERTER," the entirety of which is incorporated by reference herein.

FIELD

This disclosure relates generally to power converters, and more specifically to the reduction of electromagnetic interference in flyback converters.

BACKGROUND

The Federal Communications Commission (FCC) requires that power converters operate with limited radiated emissions to prevent electromagnetic interference (EMI) with other devices. Power converters are particularly susceptible to EMI issues due to the high power levels that are often present. Furthermore, power converters are increasingly operating at higher frequencies to reduce the value and corresponding size of components such as inductors and capacitors. High operating frequencies produce high order harmonics, which further contributes to EMI.

Methods to reduce EMI in power converters have included using snubbing circuits to absorb high frequency transients, commonly found with stray inductance experiencing a step function or discontinuous conduction. Snubber circuits may be formed by an attenuating circuit with resistors and capacitors connected by a diode to a node experiencing the transient behavior. Snubber circuits are inefficient because they waste the energy from the transient signal that is being snubbed. Another method for reducing EMI relies upon spectral spreading to spread the noisy signals over a sufficiently wide bandwidth such that each signal radiates less than the allowable EMI limit. Spectral spreading is problematic in resonant and quasi-resonant power converters because it relies upon changing the timing of a signal that must be aligned with a trough of a resonant signal to minimize switching losses.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the reduction of radiated emissions from a flyback power converter to minimize EMI while maintaining an acceptable level of converter performance. A few of the various advantages of the disclosed embodiments include minimization of switching losses, improving converter stability, a reduction of output ripple and minimization of radiated emission levels.

An active clamp is used to absorb noise from switching discontinuities and to recirculate otherwise wasted energy. The switching waveforms for a primary-side switch, used to transfer energy across a transformer, and the switching used to control the active clamp, employ variable timing to spread the remaining radiated emissions across a wider spectrum thereby reducing the amplitude of each emission below an EMI threshold (e.g. an FCC mandated threshold). The variable timing (e.g. frequency dithering) is optimized to occur at a point in a resonant cycle to minimize switching losses and is particularly well suited to resonant and quasi-resonant converters having high resonant frequencies.

Figure 1:
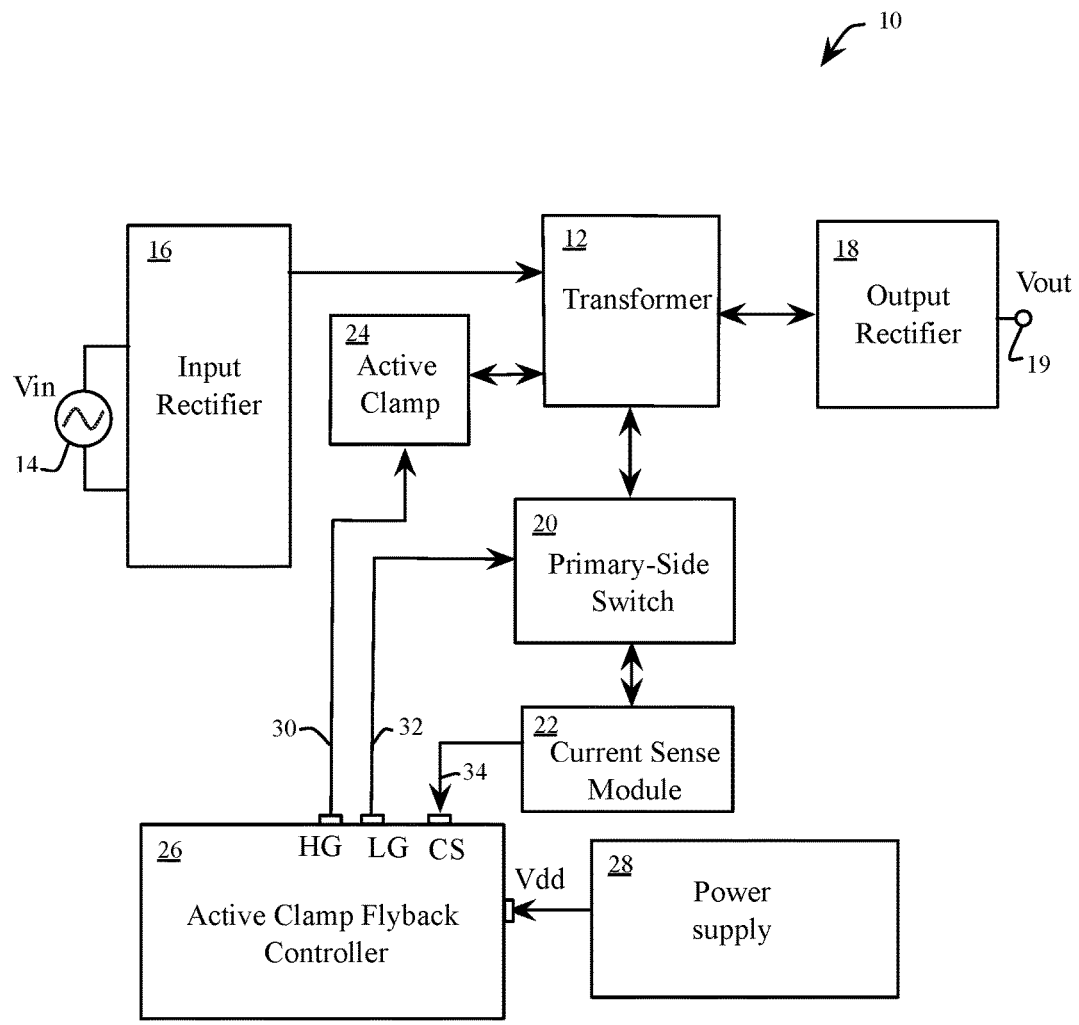
FIG. 1 is a functional block diagram of a flyback converter in accordance with an embodiment of the present disclosure.

Referring to FIG. 1, an embodiment 10 of a flyback converter includes a transformer 12, which converts an alternating voltage 14 (Vin), received though an input rectifier 16 (e.g. a bridge rectifier), to an output voltage Vout (19) rectified by an output rectifier 18. In other embodiments, the transformer 12 receives a non-alternating voltage (e.g. a "dc" voltage) to provide Vout 19. A primary-side switch 20 controls the transformer 12. A current sense module 22 senses a current flowing through the primary-side switch 20. An active clamp 24 limits transients and resonant oscillations from the transformer 12. An active clamp flyback (ACF) controller 26 controls the active clamp 24 with a high-side gate signal 30. The ACF controller 26 controls the primary-side switch 20 with the low-side gate signal 32. The ACF controller 26 further receives the sensed current signal 34 from the current sense module 22 to facilitate controlling the flyback converter 10.

Figure 2:
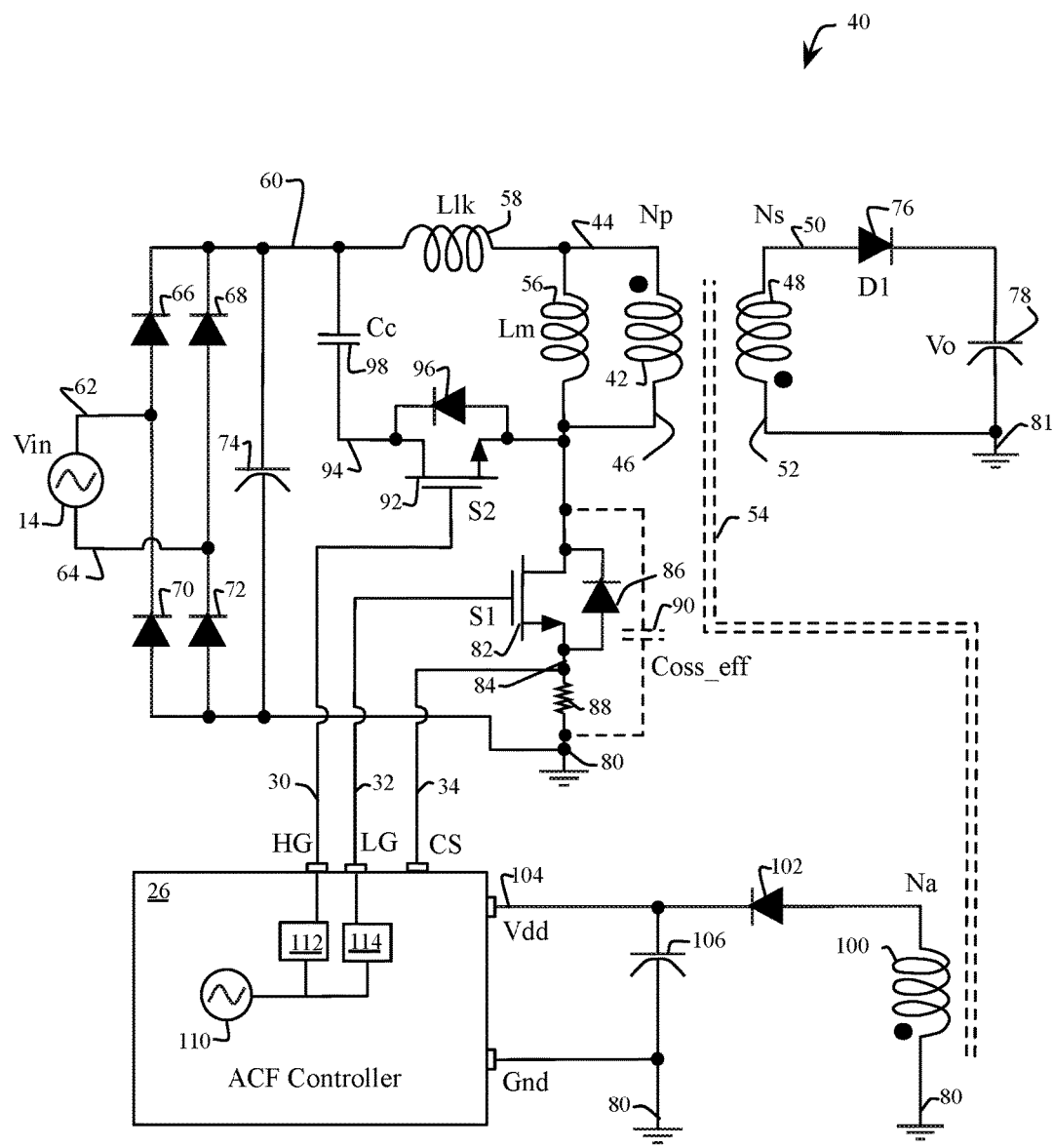
FIG. 2 is a schematic view of an example embodiment of the flyback converter shown in FIG. 1.

With continued reference to FIG. 1, FIG. 2 describes the device level implementation of an example embodiment 40 of the flyback converter. It should be understood that other example embodiments are realizable and considered within the scope and spirit of this disclosure. The transformer 12 includes a primary winding 42 between a first terminal 44 and a second terminal 46. A secondary winding 48 is between a third terminal 50 and a fourth terminal 52. The primary winding 42 is magnetically coupled to the secondary winding 48 with a core 54 (e.g. a ferrite core) and with a reverse polarity as indicated by the winding "dots". For example, a current flowing from the first terminal 44 to the second terminal 46 will create a magnetic flux, which in turn will create a current from the fourth terminal 52 to the third terminal 50. In other embodiments, the winding sense of the primary winding 42 and the secondary winding 48 are both transposed while still maintaining a reverse polarity with respect to each other.

The transformer 12 further includes a magnetizing inductance 56 in parallel with the primary winding 42 and a leakage inductance 58 connected to the first terminal 44. In various embodiments, the magnetizing inductance 56 is physically part of the primary winding 42, the core 54 and the secondary winding 52, but represented separately for electrical simulation. In various embodiments, an air gap (not shown) is added to the transformer 12 to increase a value of the mutual inductance 56. In various embodiments, the leakage inductance 58 is a parasitic element sought to be minimized or to have a controlled value during manufacture of the transformer 12.

The transformer 12 is connected to the input rectifier 16 at the primary terminal 60. The alternating voltage 14 is connected to the input rectifier 16 at terminals 62 and 64. The input rectifier 16 is configured as a bridge rectifier with diodes 66, 68, 70 and 72. The input rectifier 16 charges an input capacitor 74 connected between the primary terminal 60 and a ground terminal 80 (e.g. "ground").

The output rectifier 18 includes a secondary diode 76 connected between the third terminal and a secondary capacitor 78. In one embodiment, the secondary capacitor 78 is connected to a secondary ground 81. In another embodiment, the secondary ground is the same as the ground 80. In another embodiment, a voltage across the secondary capacitor 78 is a differential voltage not referenced to the ground 80 or the secondary ground 81. The primary-side switch 20 includes a first switch 82 ("S1" or "low-side" switch) connected between the secondary terminal 46 and a terminal 84. The first switch 82 includes a body diode 86 connected between terminal 84 and the second terminal 46. In the embodiment 40 of FIG. 2, the first switch 82 is an n-channel MOSFET (NFET) and is gated by the low-side gate (LG) 32. The first switch 82 is connected to ground 80 through a current sense module 22, including a sensing resistor 88. A sensed current signal 34, represented as a voltage across the sensing resistor 88 is provided to the ACF controller. An effective output capacitance Coss_eff 90 is formed across the first switch 82 as the drain-to-source and gate-to-source capacitance of the first switch 82.

The active clamp circuit 24 is formed by a second switch 92 connected between the second terminal 46 and a terminal 94, and is connected in parallel with a body diode 96. A clamp capacitor 98 is connected between the terminal 94 and the primary terminal 60. In various embodiments, the ACF controller 26 is powered by a power supply 28 formed by an auxiliary winding 100 sharing the same core 54 as the primary winding 42. An auxiliary diode 102 rectifies a current from the auxiliary winding 100, and charges an auxiliary capacitor 106 for supplying power (VDD) to the ACF controller. In various embodiments, the ACF controller 26 generates the high-side gate signal (HG) 30 and low-side gate signal (LG) 32 using respective pulse generators 112 and 114 fed by an oscillator 110. In another embodiment, a single waveform generator comprises both the first pulse generator and the second pulse generator. For example, the waveform generator provides both first and second pulses from common circuitry, wherein the timing of the two pulses are controlled by circuit that includes jitter adjustment of one or both of the pulses. It should be appreciated that other methods of generating the HG and LG pulse signals by the ACF controller 26 are considered within the scope and spirit of this disclosure, wherein the pulse signals contain the characteristics defined herein.

The operation of the flyback converter 40 begins by activating the primary-side switch 20 with the low-side gate 32. Conduction occurs from the primary terminal 60 (either from a rectified Vin 14 or a directly applied dc voltage), through the leakage inductance 58, the magnetizing inductance 56, the first switch 82, the sensing resistor 88 and to ground 80. The current flow through the magnetizing inductance 56 causes a magnetic flux to build in the transformer 12 to oppose the current. No current will flow in the secondary winding 48 because of its reverse polarity with respect to the primary winding 42 and the secondary diode 76 being reversed biased. When the primary-side switch 20 is opened, the current through the switch and the primary side of the transformer 12 terminates. Current will begin to flow in the secondary inductance 48 and through the secondary diode 76 until the magnetic flux is fully depleted (or removed) by generating the current that attempts to sustain the magnetic flux.

When the magnetic flux has fully depleted, the electromotive force on the primary side of the transformer 12, induced by the current flowing in the secondary side, will also vanish. Thus a circuit formed by the magnetizing inductance Lm 56 and the Coss_eff 90 is allowed to resonate, resulting in a dampened oscillation at the second terminal 46 (and across the primary-side switch), with a period given by the following formula:

$$T_{resonance} = 2*\pi*\text{Square-root}(Lm*C_{oss\_eff})$$

The active clamp 24 is activated, (e.g. turned on), by the high-side gate 30 during two periods. The first period snubs a voltage spike, (e.g. a high frequency damped oscillation), at the second terminal 46 caused by the residual energy stored in the leakage inductance 58 and the sudden discontinuity of the primary-side switch 20 being deactivated. The second period snubs the damped oscillation formed by the resonant circuit formed by Lm and Coss_eff. The snubbing effect of the active clamp reduces radiated emissions but also protects the primary-side switch from damage caused by exceeding its blocking voltage BVDSS.

Figure 3:
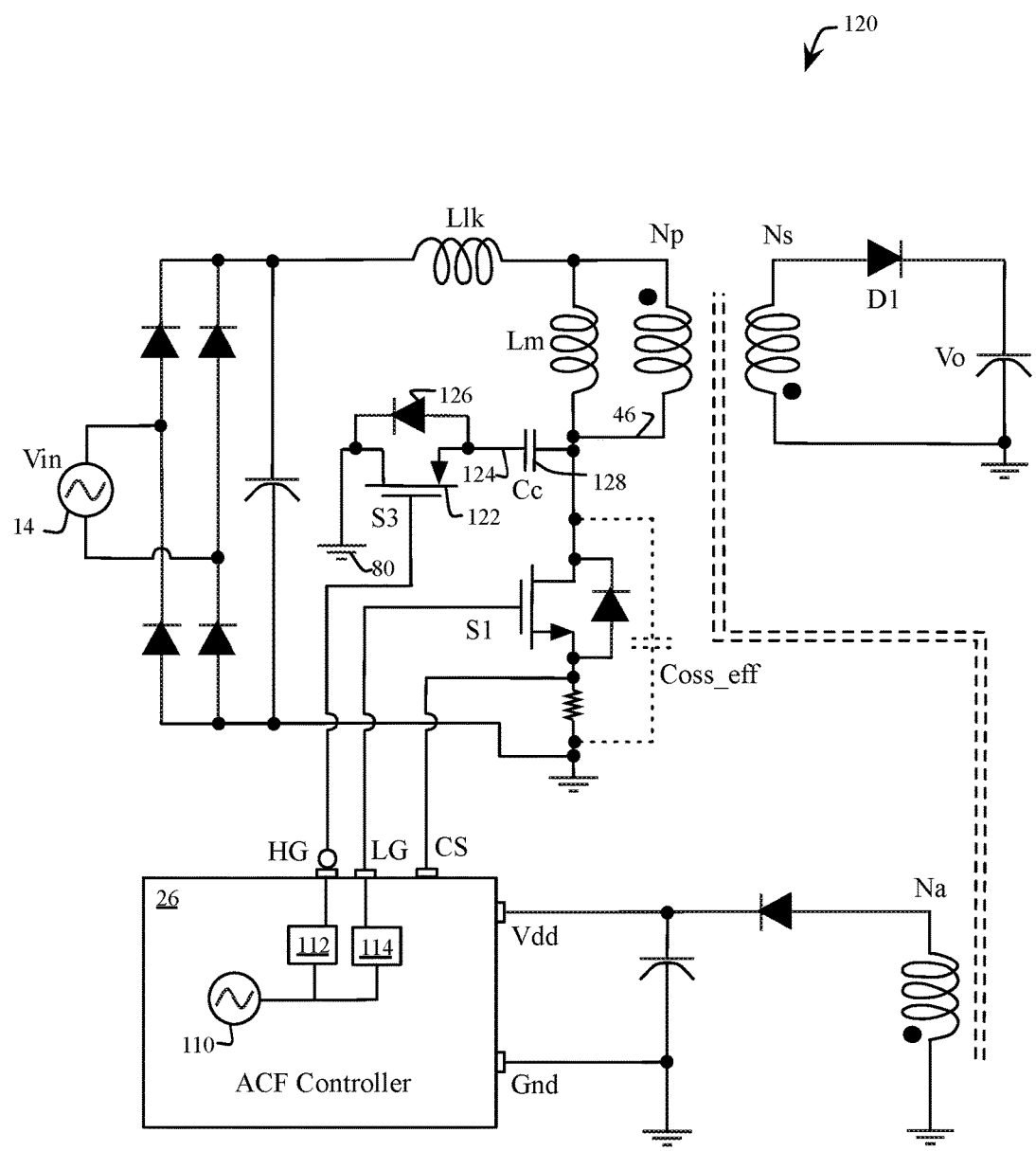
FIG. 3 is a schematic view of an example embodiment of the flyback converter of FIG. 2 including an alternative embodiment of the active clamp circuit.

With reference to FIG. 3 and continued reference to FIG. 1 and FIG. 2, an alternative example embodiment 120 of a flyback converter is shown with an active clamp 24 based on a p-channel MOSFET (PFET). It should be understood that other example embodiments are realizable and considered within the scope and spirit of this disclosure. The active clamp circuit 24 includes a third switch 122 between the terminal 124 and ground 80. The third switch 122 has a body diode 126 connected in parallel with the drain and source of third switch 122. A clamp capacitor 128 is connected between the terminal 124 and the second terminal 46. The operation of the embodiment 120 of the flyback converter of FIG. 3 and the embodiment 40 of FIG. 2 are similar.

Figure 4:
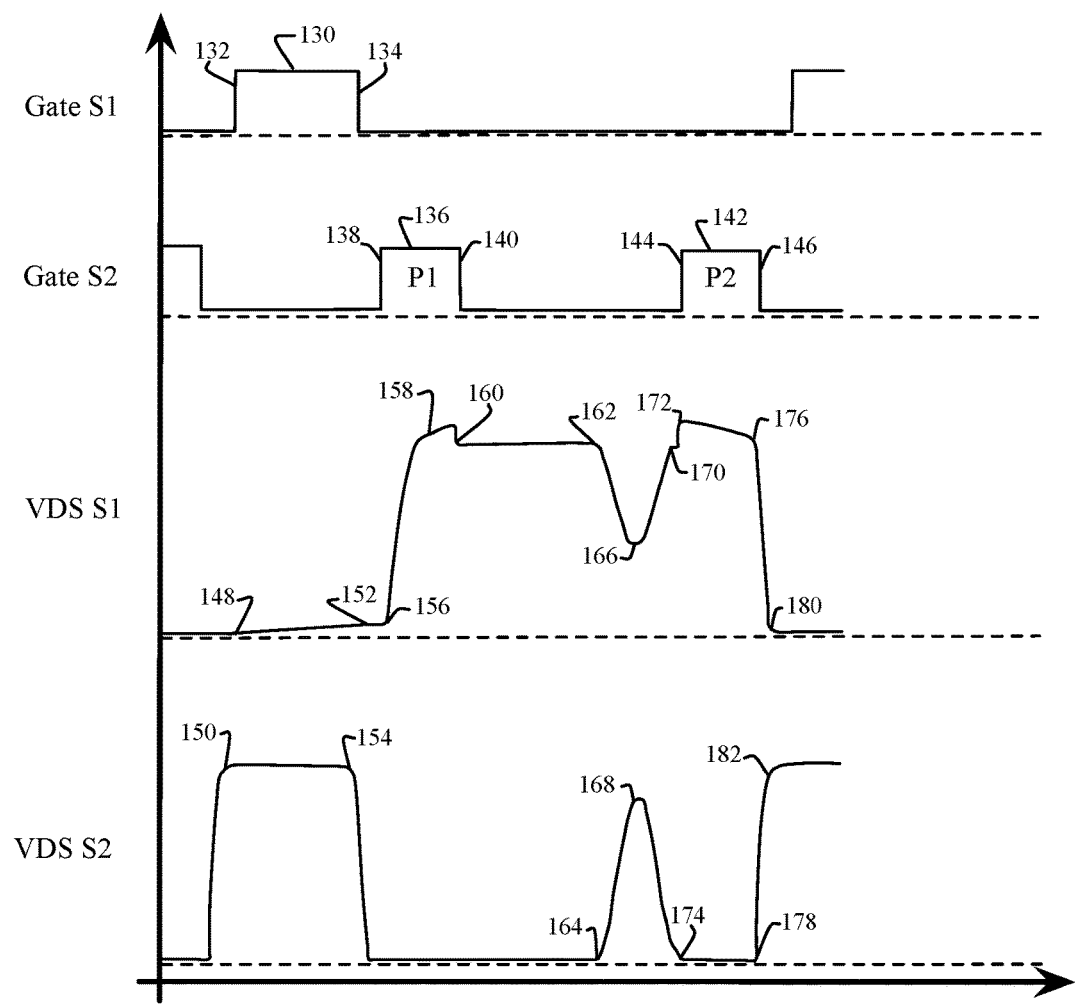
FIG. 4 is a graphical view of a simulation of a power conversion cycle of a flyback converter showing the respective gate and drain-to-source voltages.

FIG. 4 in conjunction with FIG. 2 illustrates a switching cycle of a flyback converter operating in a discontinuous conduction mode (DCM). Gate S1 activates the first switch 20 with a pulse 130 having a leading edge 132 and a trailing edge 134. Gate S2 activates the active clamp 24 having the second switch 96, with a first pulse P1 and a second pulse P2. The first pulse P1 136 has a leading edge 138 and a trailing edge 140. The second pulse P2 142 has a leading edge 144 and a trailing edge 146. At the leading edge 132, the first switch 20 is activated, while the drain-to-source voltage (VDS S1) is at ground potential at 148, thus providing for zero voltage switching (ZVS). As the second terminal voltage is discharged towards ground, the voltage VDS S2 across the active clamp 24 increases at 150.

During the Gate S1 pulse 130, current flows in the primary side of the transformer 12, which stores the accumulated energy as magnetic flux. A slight rise in VDS S1 occurs until 152, relative to 148, due to the finite resistance of the first switch 82, with a corresponding finite drop in VDS S2 at 154, relative to 150. After the Gate S1 pulse 130 is terminated, the current in the secondary winding 48 will begin flowing, the output voltage across the secondary winding 48 will be transformed down to the primary winding 42, and VDS S1 will rise from 156 to 158. The first pulse 136 of Gate S2 is activated to suppress a voltage spike that would otherwise occur at 158, due to current in the leakage inductance 58. The first pulse 136 is terminated at 160, and VDS S1 is maintained as current continues to flow in the secondary winding 48 due to the remaining magnetic flux in the transformer 12.

At the "knee-point" 162, the magnetic flux in the transformer 12 has been fully depleted (e.g. removed) thus terminating the electromagnetic force imposed on the primary winding 42 from the current in the secondary winding 48. A resonant circuit formed by the magnetizing inductance 56 and Coss_eff 90 will then causes a dampened oscillation to occur at the second terminal 46. Accordingly, VDS S1 oscillates from 162 to a low point at 166 and then returns to 170, while VDS S2 oscillates 164 to a high point at 168 and then returns to 174.

When the potential across VDS S2 is at a minimum at 174, the second pulse 142 of Gate S2 is activated, causing a small capacitive step function between 170 and 172. The activation of the second pulse 142 terminates the resonance by shunting the magnetizing inductance 56. The second pulse 142 is terminated at 146 causing VDS S1 to return to ground from 176 to 180, and VDS S2 to rise from 178 to 182.

Figure 5:
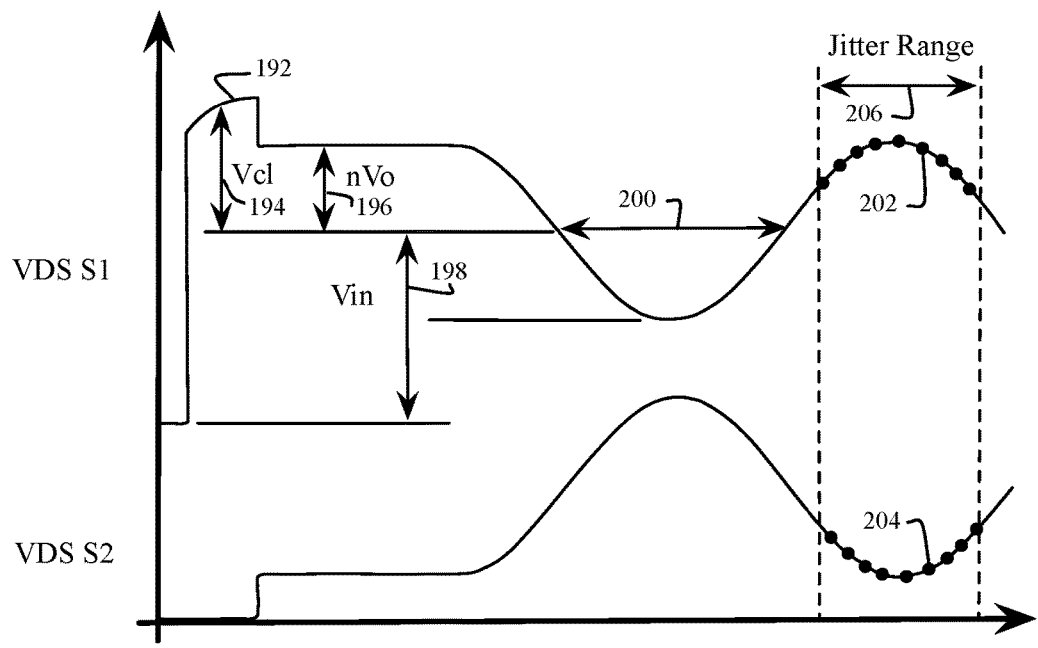
FIG. 5 is a graphical view of the simulation of FIG. 4 showing the effect of adding jitter to a leading edge of a switch S2 at a low resonant frequency.
Figure 6:
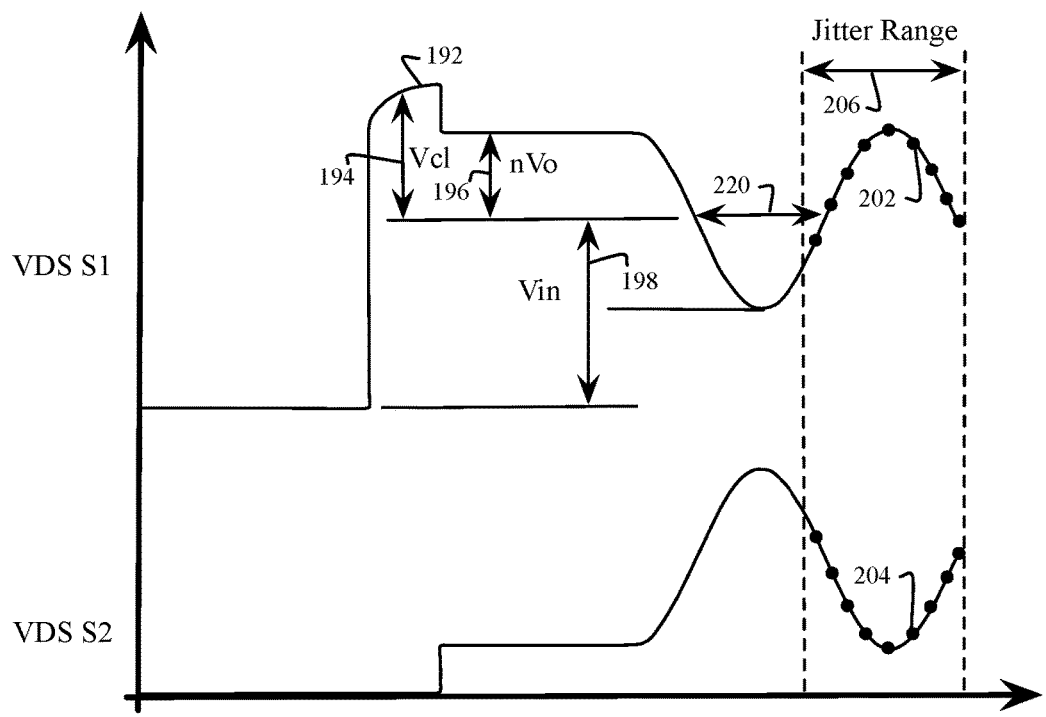
FIG. 6 is a graphical view of the simulation of FIG. 4 showing the effect of adding jitter to a leading edge of a switch S2 at a resonant frequency higher than shown in FIG. 5.

FIG. 5 and FIG. 6 show the effects of adding jitter to the pulsed waveforms of the active clamp 24, with the second pulse 142 centered at a time where VDS S2 is a minimum. FIG. 5 and FIG. 6 show the waveforms as presented in FIG. 4, where the ringing voltage is snubbed by the first pulse 136 at 192, and clamped to a voltage equal to a clamping voltage 194 above the alternating voltage (Vin) 198 presented at the input of the flyback converter. Once the first pulse 136 is terminated, the VDS S1 voltage remains at a level of nVo 196 above the average of Vin 198, where nVo is the reflected output voltage of transformer 12 reflected from the secondary side to the primary side reduced through a turns ratio "n" (e.g. the ratio of the number of winding turns of the secondary winding 48 divided by the primary winding 42). The critical time period 200 in FIG. 5 and 220 in FIG. 6 represent the lower half of the resonant cycle where switching the second pulse 142 will radiate a minimum amount of energy. When jitter is added to the pulsed waveforms controlling the active clamp 24, the cumulative emissions from current discontinuities and resonance are reduced by spreading many of the emissions over a wider spectrum. The radiated emissions are effectively reduced below a required EMI threshold by adding jitter to the pulsed waveforms with the methods described herein.

In FIG. 5 and FIG. 6, nine timing values 202 shown for VDS S1, and similarly 204 shown for VDS S2, represent the leading edge 144 of the second pulse varied within a jitter range 206. At the relatively long resonant period of 800 ns to 1000 ns shown in FIG. 5, the jitter range of 400 ns does not encroach within the critical time period 200. However, as resonant frequencies increase, as shown in FIG. 6 for a resonant period of 500 ns to 600 ns, the same 400 ns jitter range results in the leading edge 144 of the second pulse radiating significant emissions that compromise EMI compliance. It should be understood that various jitter ranges and number of jitter positions within a jitter range are possible in various embodiments.

Figure 7:
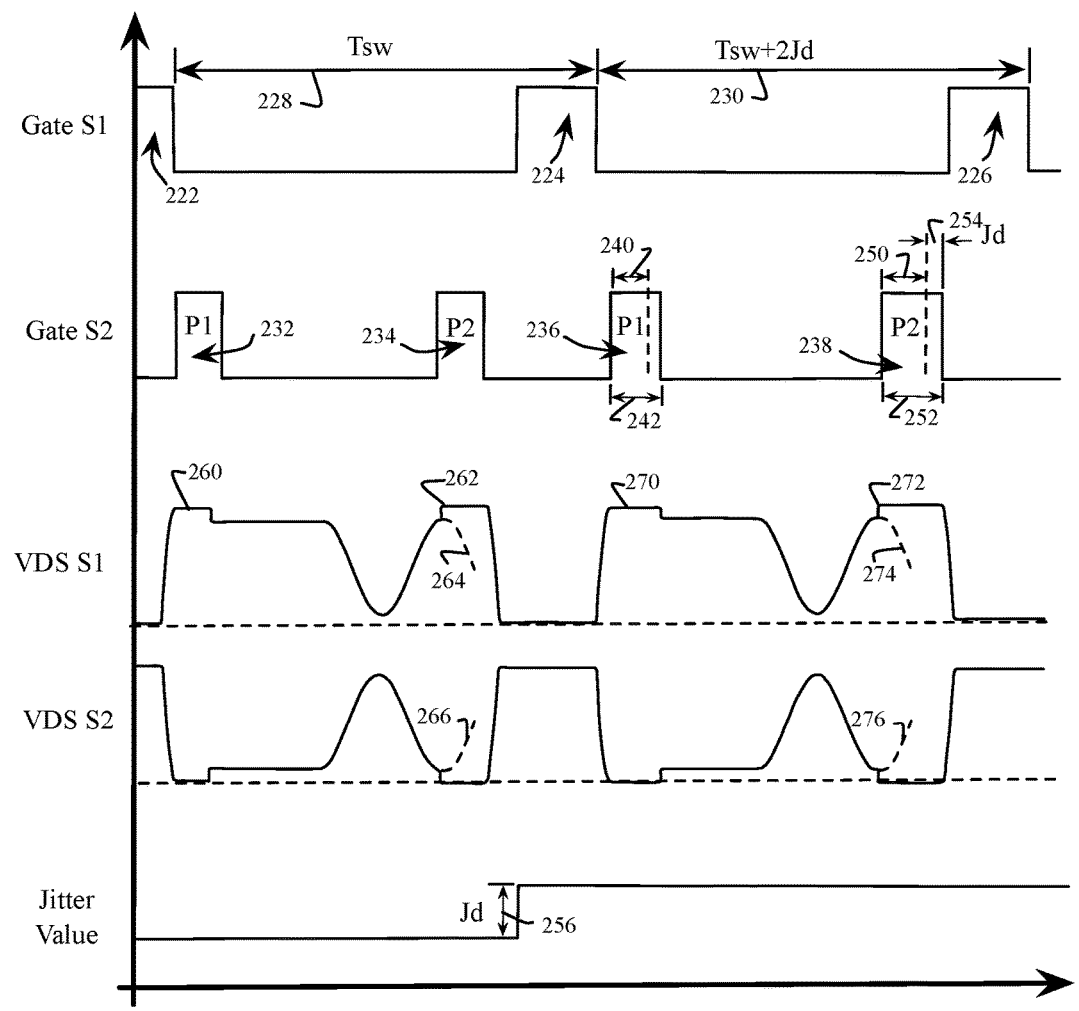
FIG. 7 is a graphical view of the simulation of FIG. 4 showing the effect of adding jitter to a trailing edge of a switch S2 including the optimization of the leading edge of switch S2 in accordance with an embodiment of the present disclosure.

Turning now to FIG. 7, the second pulse is optimized by moving the leading edge to be coincident with maximum VDS S1 value, (or conversely the minimum VDS S2 value), and adding the jitter to the trailing edge of the second pulse. FIG. 7 shows a series of first pulses 222, 224 and 226 controlling the gate of the first switch 82, having a first period (Tsw) 228 without jitter applied, and a second period (Tsw+2Jd) 230 with jitter applied. A series of second pulses 232, 234, 236 and 238 are shown. The first two pulses 232 and 234 correspond to the period 228 without jitter applied. The second set of two pulses 236 and 238 correspond to the second period 230 with jitter applied. The width of the pulses 236 and 238 are shown before the application of jitter as 240 and 250 respectively, and after the application of jitter as 242 and 252 respectively, where the jitter value (Jd) is shown as 254.

Similar to FIG. 4, the first pulse 232 applied to the active clamp 24 snubs a voltage spike at 260, and the second pulse 234 terminates the resonance at 262, without which, the waveforms VDS S1 and VDS S2 would continue as shown at 264 and 266 respectively. With jitter applied to the trailing edge, the first pulse of the second period 236 applied to the active clamp 24 snubs a voltage spike at 270, and the second pulse of the second period 238 terminates the resonance at 272, without which, the waveforms VDS S1 and VDS S2 would continue as shown at 264 and 276 respectively. A jitter value 256 is shown as provided in various embodiments, where the amplitude of the jitter value 256 is proportional to the jitter timing 254. In a further example, the jitter value 256 controls the timing of the second pulse generator 112 of FIG. 2.

Figure 8:
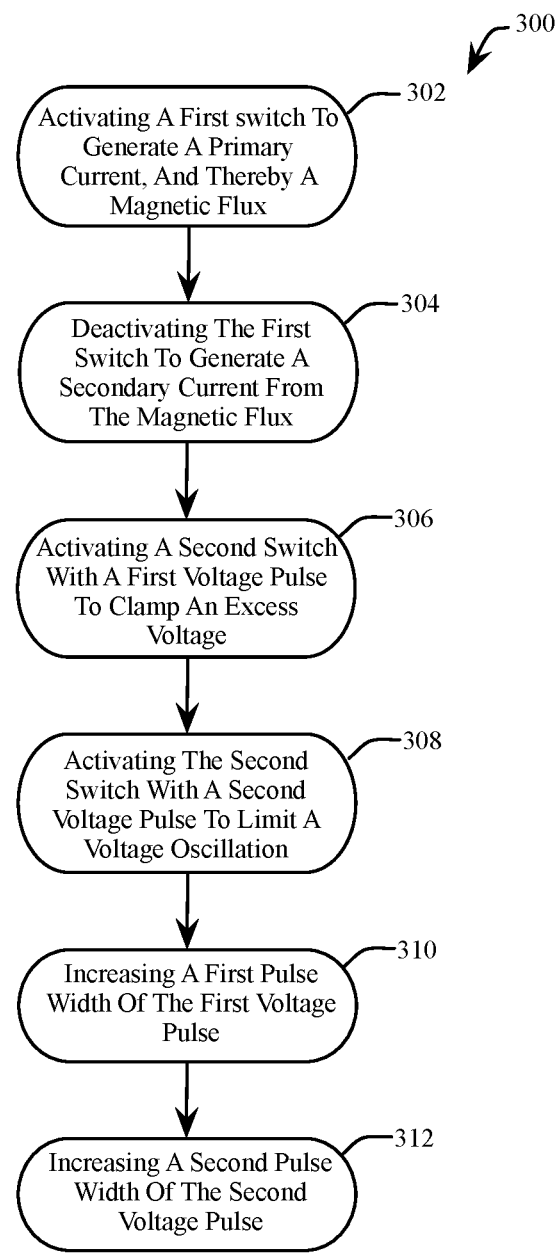
FIG. 8 is a flowchart representation of a method for reducing electromagnetic interference in a flyback converter in accordance with an embodiment of the present disclosure.

FIG. 8 shows a method 300 for reducing EMI applicable to the embodiments described herein. With reference to FIG. 1, FIG. 7 and FIG. 8, at 302, a first switch (e.g., a primary-side switch 20) is activated to generate a primary current, and thereby a magnetic flux. In one example, the magnetic flux is generated in a primary winding of a transformer and the magnetic flux is generated in a core of the transformer. At 304, the first switch (e.g., a primary-side switch 20) is deactivated to generate a secondary current from the magnetic flux developed at 302. At 306, a second switch (e.g., an active clamp circuit), is activated with a first voltage pulse to clamp an excess voltage (e.g., a voltage spike) as shown in FIG. 4, FIG. 6 and FIG. 7. At 308, the second switch (e.g., an active clamp circuit) is activated by a second voltage pulse to limit an oscillating, (e.g., resonant) voltage. At 310, a first pulse width of the first voltage pulse is increased, as shown by 242 in FIG. 7. At 312, a second pulse width of the second voltage pulse is increased, as shown by 252 in FIG. 7.

As will be appreciated, embodiments as disclosed include at least the following. In one embodiment, a flyback converter comprises a primary-side switch configured to ground a primary winding of a transformer. An active clamp is configured to limit an excess voltage across the primary-side switch. An active clamp flyback (ACF) controller is connected to the active clamp circuit and the primary-side switch. The ACF controller comprises a first pulse generator configured to activate the primary-side switch to generate a magnetic flux in the transformer, and is configured to deactivate the primary-side switch to generate, from the magnetic flux, a secondary current in the secondary winding of the transformer. The magnetic flux is removed by the generation of the secondary current. A second pulse generator is configured to activate the active clamp circuit with a first voltage pulse followed by a second voltage pulse. The first voltage pulse activates the active clamp circuit to limit the excess voltage in response to the primary-side switch being deactivated. The second voltage pulse limits a voltage oscillation across the primary-side switch in response to a magnetizing inductance of the transformer resonating with an effective capacitance of the primary-side switch, the resonance occurring the removal of the magnetic flux. A first width of the first voltage pulse is increased by a first jitter delay. A second width of the second voltage pulse is increased by a second jitter delay.

Alternative embodiments of the flyback converter include one of the following features, or any combination thereof. The active clamp circuit comprises an N-channel transistor connected in series with a clamp capacitor. The active clamp circuit is connected in parallel with the primary winding of the transformer. The active clamp circuit comprises a P-channel transistor connected in series with a clamp capacitor. The active clamp circuit is connected between a drain of the primary-side switch and a ground terminal. A waveform generator comprises the first pulse generator and the second pulse generator. A leading edge of the second voltage pulse coincides with a maximum of a resonant voltage of the voltage oscillation. The first jitter delay is added to a first trailing edge of the first voltage pulse, and the second jitter delay is added to a second trailing edge of the second voltage pulse. The first jitter delay is equal to the second jitter delay. The first jitter delay and the second jitter delay are each respective ones of a plurality of jitter delays chosen to reduce an amplitude of a radiated emission of at least one of the excess voltage and a resonant voltage of the voltage oscillation below an electromagnetic interference limit.

In another embodiment, an active clamp flyback (ACF) controller comprises a first pulse generator configured to activate a first switch to generate a primary current therein, and configured to deactivate the first switch to generate a secondary current from a magnetic flux generated by the primary current. The magnetic flux is removed by the generation of the secondary current. A second pulse generator is configured to activate a second switch connected to the first switch, with a first voltage pulse followed by a second voltage pulse. The first voltage pulse limits an excess voltage across the first switch. The excess voltage is generated in response to the deactivation of the first switch. The second voltage pulse limits a voltage oscillation across the first switch, the voltage oscillation occurring after the removal of the magnetic flux. A first width of the first voltage pulse is increased by a first jitter delay. A second width of the second voltage pulse is increased by a second jitter delay.

Alternative embodiments of the ACF controller include one of the following features, or any combination thereof. The first switch is a primary-side switch configured to generate the primary current in the a primary winding of a transformer, the magnetic flux in the transformer, and the secondary current in a secondary winding of the transformer. A waveform generator comprises the first pulse generator and the second pulse generator. A leading edge of the second voltage pulse coincides with a maximum of a resonant voltage of the voltage oscillation. The first jitter delay is added to a first trailing edge of the first voltage pulse and the second jitter delay is added to a second trailing edge of the second voltage pulse. The first jitter delay is equal to the second jitter delay. The first jitter delay and the second jitter delay are each respective ones of a plurality of jitter delays chosen to reduce an amplitude of a radiated emission of at least one of the excess voltage and a resonant voltage of the voltage oscillation below an electromagnetic interference limit.

In another embodiment, a method for reducing electromagnetic interference in a flyback converter comprises activating a first switch to generate a primary current therein. The first switch is deactivated to generate a secondary current from the magnetic flux generated by the primary current. The magnetic flux is removed by the generation of the secondary current. A second switch is activated with a first voltage pulse to limit an excess voltage across the first switch. The excess voltage is generated in response to the deactivation of the first switch. A second switch is activated with a second voltage pulse to limit a voltage oscillation across the first switch. The voltage oscillation occurs after the removal of the magnetic flux. A first pulse width of the first voltage pulse is increased by a first jitter delay. A second pulse width of the second voltage pulse is increased by a second jitter delay.

Alternative embodiments of the method for reducing electromagnetic interference in a flyback converter include one of the following features, or any combination thereof. Generating the second voltage pulse includes gating the leading edge of the second pulse to coincide with a maximum of a resonant voltage of the voltage oscillation. Increasing the first pulse width and the second pulse width includes delaying a respective trailing edge of the first voltage pulse and the second voltage pulse by the respective first jitter delay and second jitter delay. The first pulse width and the second pulse width are increased by a same jitter delay. A subsequent first pulse width of a subsequent first voltage pulse and a subsequent second pulse width of a subsequent second voltage pulse are each increased by a different jitter delay than the first jitter delay and the second jitter delay of the respective first voltage pulse and the second voltage pulse, thereby reducing an amplitude of a radiated emission of the flyback converter below an electromagnetic interference limit.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An active clamp flyback controller comprising:
   a pulse generator configured to activate an active clamp of a flyback converter with a first pulse followed by a second pulse, a first width of the first pulse increased by a first jitter delay and a second width of the second pulse increased by a second jitter delay, the active clamp configured to clamp a voltage at a terminal of a primary-side switch of the flyback converter, the first pulse configured to limit an excess voltage at the terminal, the second pulse configured to limit a voltage oscillation at the terminal; and a current sense circuit configured to determine a primary current through the primary-side switch, the primary current controlling a first timing of the first pulse and a second timing of the second pulse.

2. The controller of claim 1 wherein the active clamp circuit comprises an N-channel transistor connected in series with a clamp capacitor, the active clamp circuit connected in parallel with a primary winding of a transformer of the flyback controller.

3. The controller of claim 1 wherein the active clamp circuit comprises a P-channel transistor connected in series with a clamp capacitor, the active clamp circuit connected between a drain of the primary-side switch and a ground terminal.

4. The controller of claim 1 wherein the pulse generator is a waveform generator.

5. The controller of claim 1 wherein a leading edge of the second pulse coincides with a maximum of a resonant voltage of the voltage oscillation at the terminal.

6. The controller of claim 1 wherein the first jitter delay is added to a first trailing edge of the first pulse, and the second jitter delay is added to a second trailing edge of the second pulse.

7. The controller of claim 1 wherein the first jitter delay is equal to the second jitter delay.

8. The controller of claim 1 wherein the first jitter delay and the second jitter delay are each respective ones of a plurality of jitter delays chosen to reduce an amplitude of a radiated emission of at least one of the excess voltage and a resonant voltage of the voltage oscillation below an electromagnetic interference limit.

9. An active clamp flyback controller comprising:

a pulse generator connected to a gate of a transistor and configured to generate a first pulse followed by a second pulse, the controller configured to change a first width of the first pulse by one of a plurality of first jitter delays and a second width of the second pulse by one of a plurality of second jitter delays, the transistor clamping an excess voltage at a terminal of a primary-side switch, in response to the first pulse, the transistor clamping a voltage oscillation at the terminal, in response to the second pulse; and a current sense circuit generating a current sense voltage proportional to a primary current flowing through the primary-side switch, the current sense voltage controlling a first timing of the first pulse and a second timing of the second pulse.

10. The controller of claim 9 wherein the primary-side switch is configured to generate the primary current in a primary winding of a transformer of a flyback converter.

11. The controller of claim 9 wherein a waveform generator comprises the pulse generator.

12. The controller of claim 9 wherein a leading edge of the second voltage pulse coincides with a maximum of a resonant voltage of the voltage oscillation at the terminal.

13. The controller of claim 9 wherein one of the first jitter delays is added to a first trailing edge of the first voltage pulse and one of the second jitter delays is added to a second trailing edge of the second voltage pulse.

14. The controller of claim 13 wherein the one of the first jitter delays is equal to the one of the second jitter delays.

15. The controller of claim 9 wherein the plurality of first jitter delays and the plurality of second jitter delays are chosen to reduce an amplitude of a radiated emission of at least one of the excess voltage and a resonant voltage of the voltage oscillation below an electromagnetic interference limit.

16. A method for reducing electromagnetic interference in a flyback converter comprising:

activating an active clamp with a first pulse to limit an excess voltage on a terminal of a primary-side switch;

activating the active clamp with a second pulse to limit a voltage oscillation at the terminal;

changing a first pulse width of the first pulse by a first jitter delay;

changing a second pulse width of the second pulse by a second jitter delay; and generating a current sense voltage proportional to a primary current flowing through a primary-side switch, the current sense voltage controlling a first timing of the first pulse and a second timing of the second pulse.

17. The method of claim 16 wherein generating the second pulse includes gating the leading edge of the second pulse to coincide with a maximum of a resonant voltage of the voltage oscillation at the terminal.

18. The method of claim 16 wherein increasing the first pulse width and the second pulse width includes delaying a respective trailing edge of the first pulse and the second pulse by the respective first jitter delay and second jitter delay.

19. The method of claim 16 further comprising increasing the first pulse width and the second pulse width by a same jitter delay.

20. The method of claim 19 wherein a subsequent first pulse width of a subsequent first pulse and a subsequent second pulse width of a subsequent second pulse are each increased by a different jitter delay than the first jitter delay and the second jitter delay of the respective first pulse and the second pulse, thereby reducing an amplitude of a radiated emission of the flyback converter below an electromagnetic interference limit.

* * * * *